United States Patent Office 3,478,988
Patented Nov. 18, 1969

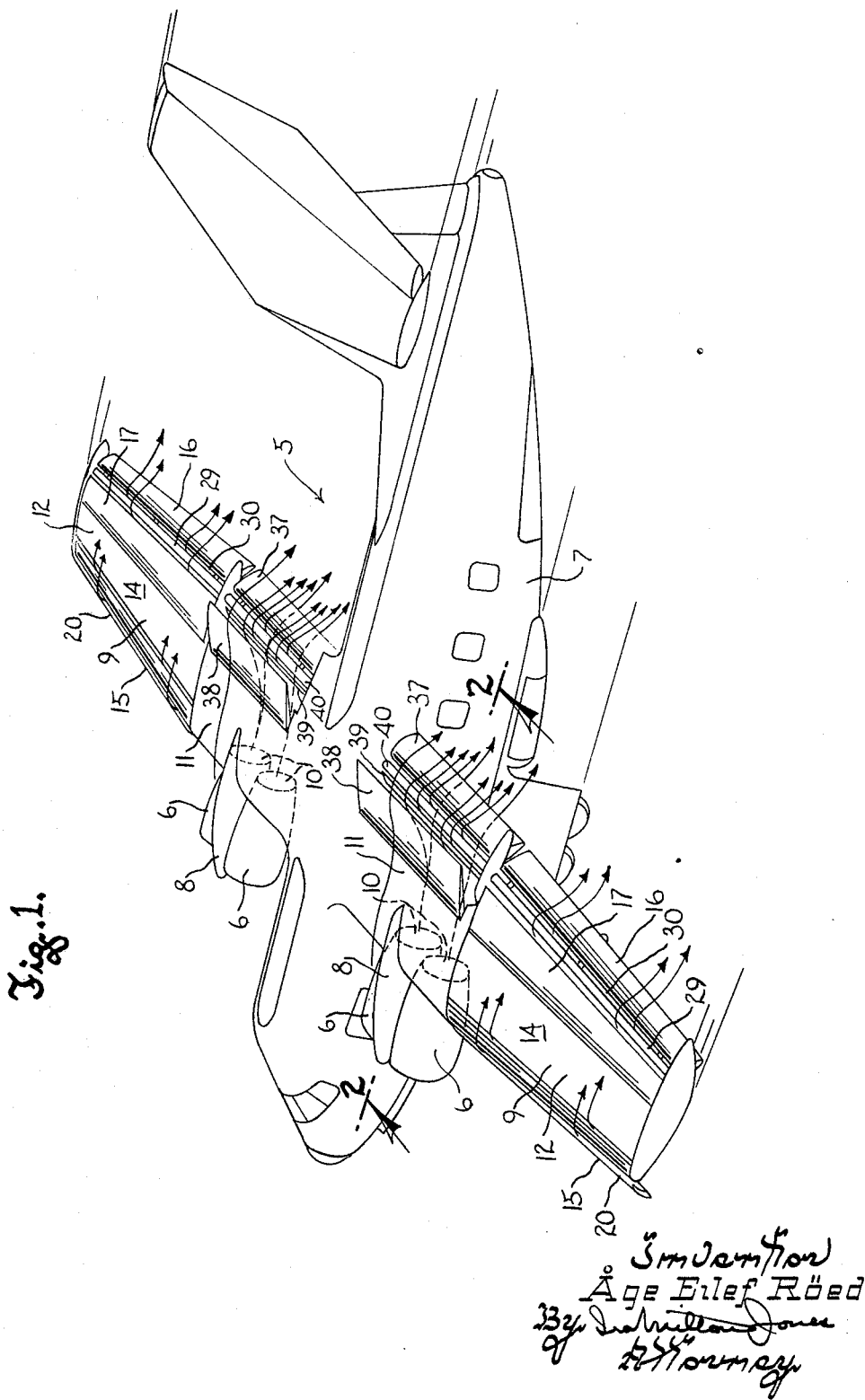

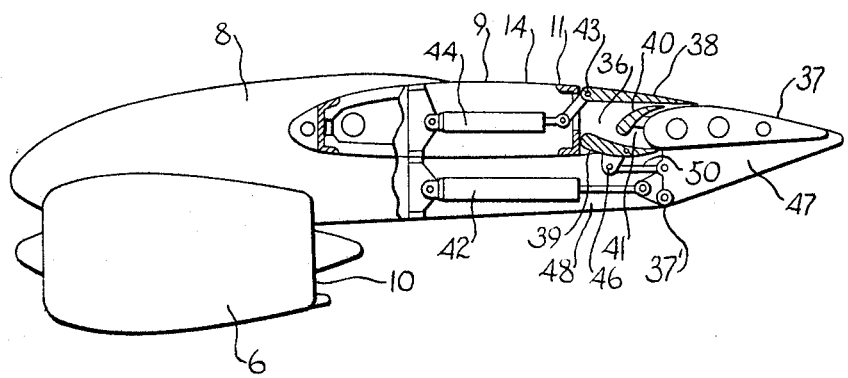
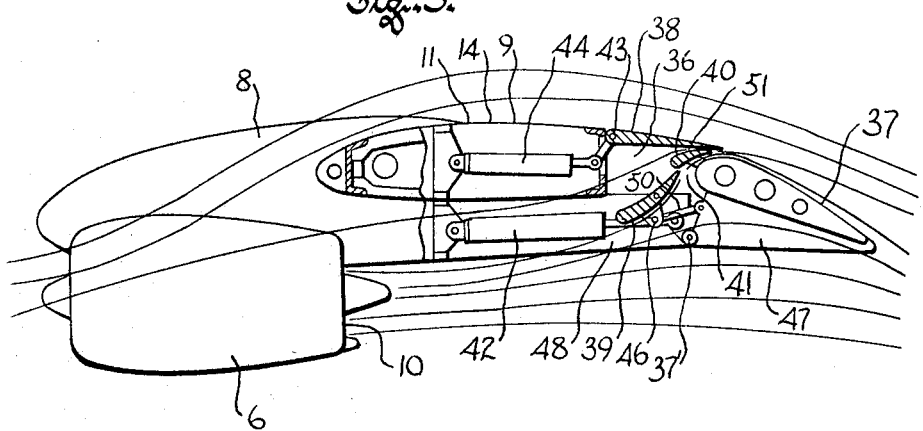

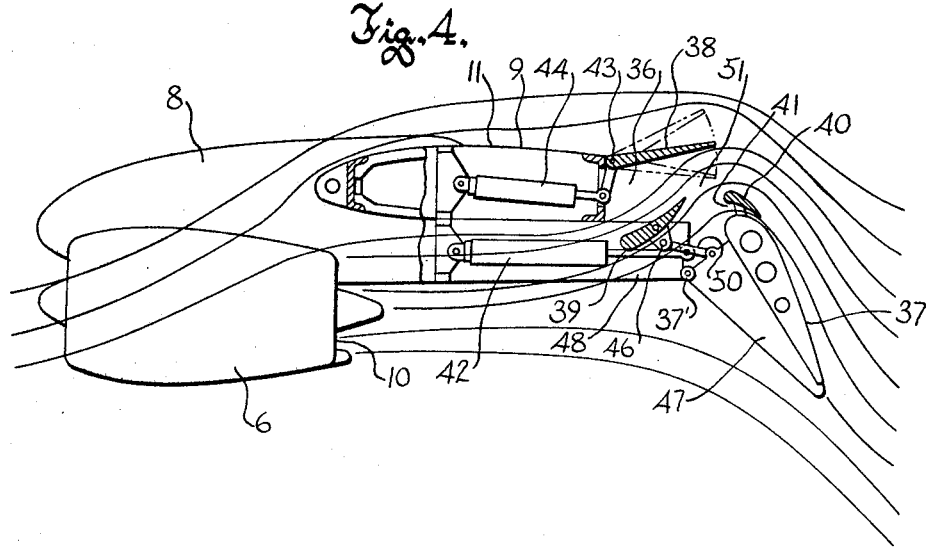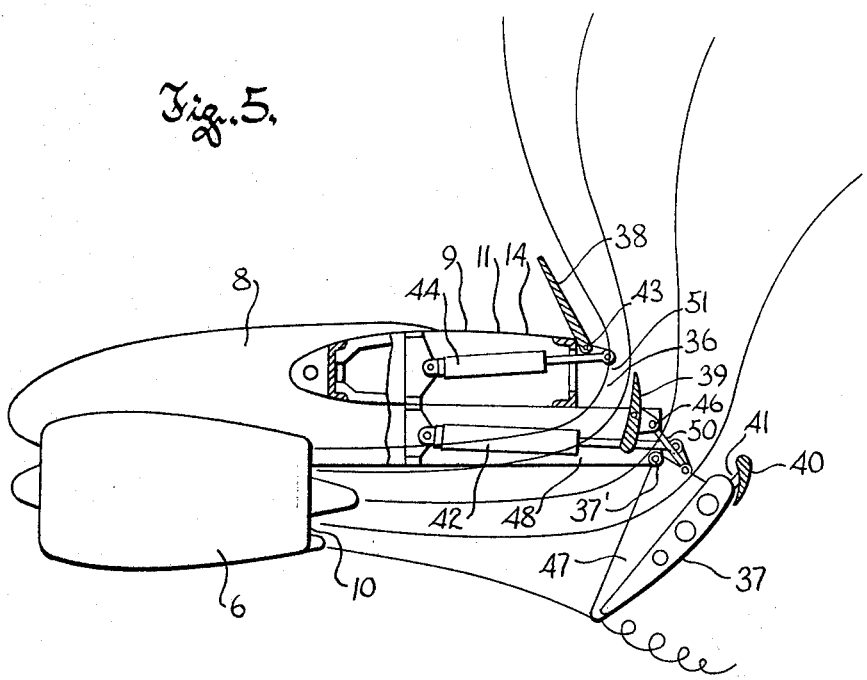

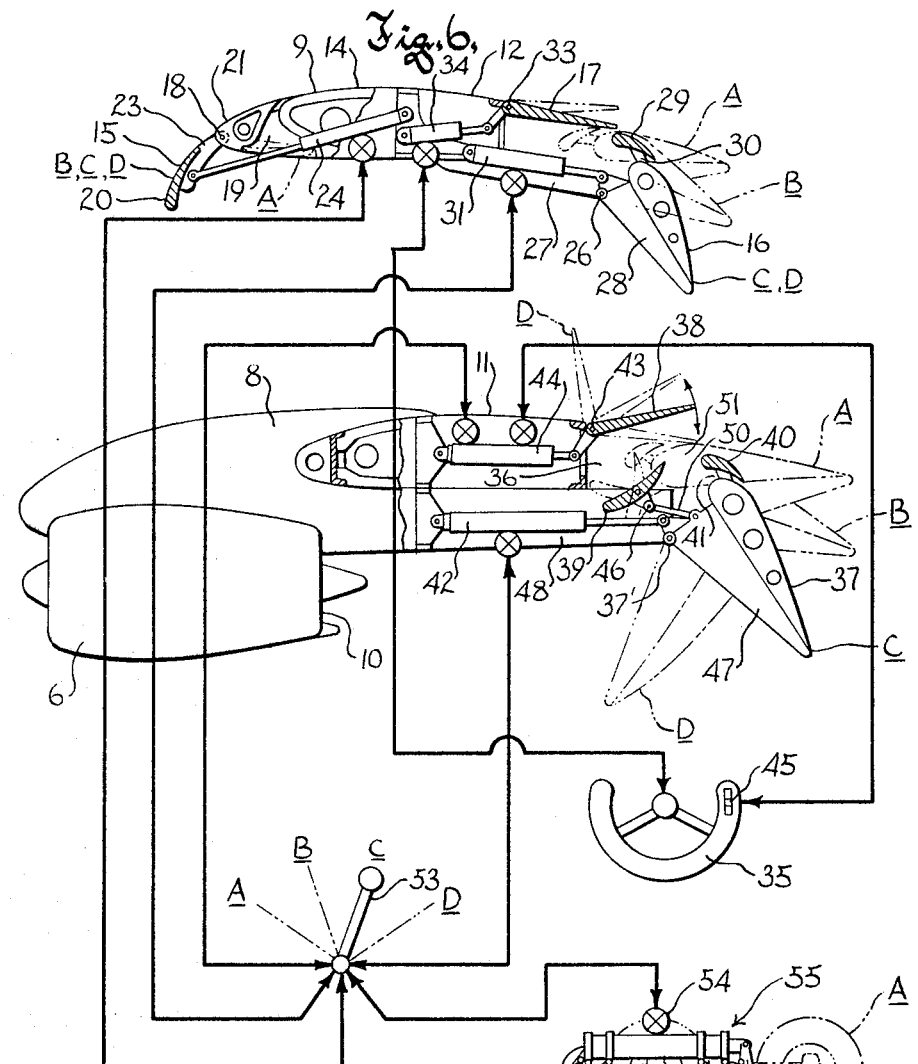
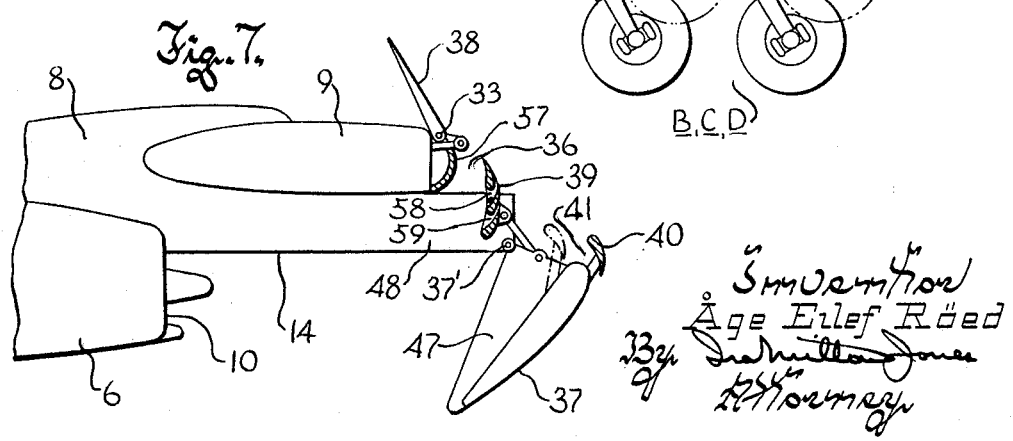

3,478,988
STOL AIRCRAFT HAVING BY-PASS TURBOJET ENGINES
Åge Eilef Röed, Linkoping, Sweden, assignor to SAAB Aktiebolag, Linkoping, Sweden, a corporation of Sweden
Filed Nov. 28, 1967, Ser. No. 686,225
Claims priority, application Sweden, Nov. 29, 1966, 16,332/66
Int. Cl. B64c 3/50, 15/06, 9/10
U.S. Cl. 244—42
6 Claims

ABSTRACT OF THE DISCLOSURE

In an aircraft powered by turbojet engines of the by-pass type mounted beneath inboard wing sections, the latter have trailing edge flaps spaced rearwardly from the fixed part of the wing, the chordwise gap being normally closed by upper and lower medial flaps. The outboard wing sections have retractable lift augmentation means and differential spoilers. Simplified controls coordinate positions of movable wing elements according to operating regime. For ground roll braking, the inboard flaps cooperate to deflect engine exhaust upward and forward. For glide slope control the upper intermediate flaps function as spoilers.

---

This invention relates to controllable means for augmenting the lift and increasing the drag of a fixed wing aircraft, and more particularly to lift and drag augmentation means for a jet aircraft by which low minimum flying speed, precise control of the glide slope and rapid aerodynamic deceleration of the aircraft during its landing roll can all be obtained.

An aircraft designed for operation into and out of small landing areas often requires more runway length for landing than for takeoff, whereas for optimum STOL performance the minimum runway length required for takeoff should be adequate for landing. To achieve this optimum, an STOL aircraft should not only have a low touchdown speed, but should be capable of rapid deceleration after touchdown without excessive reliance upon wheel brakes, and its glide slope during the landing approach should be capable of very precise control so that it can be maneuvered for touchdown at exactly a preselected spot on the landing area, to insure that as much as possible of the available runway length can be utilized for ground roll.

Aircraft have heretofore been provided with lift augmentation devices and drag producing means to enable approach and touchdown to be made at relatively low speeds. Most commonly these take the form of trailing edge wing flaps, but in some instances leading edge flaps or slats have also been used, to increase wing lift without producing a greatly disproportionate increase in drag. In a few instances air brakes or spoilers have been used for producing drag without increasing lift.

Such aerodynamic devices afford some deceleration during the high speed portion of the landing roll immediately following touchdown, but before the aircraft slows to the point at which substantial braking force can be applied to the wheels they lose their effectiveness for producing substantial drag.

In propeller aircraft, very effective deceleration can be obtained during the entire landing roll by reversing propeller pitch and utilizing engine power for aerodynamic braking; and with certain types of jet engines thrust reversal is available to accomplish deceleration in a similar manner. However, no efficient thrust reverser is known for turbojet engines of the by-pass type, and therefore aircraft equipped with such engines have usually required runways at least as long as are needed for those with jet engines having thrust reversers, even when they can utilize substantially shorter runways for takeoff.

To some extent low minimum flying speeds have been attained with aircraft having turbojet engines of the by-pass type by causing the exhaust stream from the engine to flow through a slot located in the lifting surface in front of the trailing edge flaps and to be blown over the top surface of the flaps to provide for boundary layer control that delays flow separation at the leading edges of the flaps. However, to obtain full efficiency from this arrangement it is necessary to maintain a substantial amount of engine thrust, with the result that, in a landing utilizing this expedient, touchdown occurs while the engine is producing fairly high power, and the ground roll is increased accordingly. Hence the arrangement just described is mainly valuable for reducing takeoff distance, and an aircraft so equipped usually requires a longer runway for landing than for takeoff.

With respect to the problem of precisely controlling glide slope, so that touchdown can be made as near as possible to the approach end of the runway, reliance has heretofore been placed mainly upon the skill of the pilot. The usual manner of controlling the glide slope when small, quick corrections were needed has been to increase or decrease the angle of attack of the wing by rotation of the whole airplane in pitch. However it has been difficult to obtain both rotation and the damping of rotation once initiated, owing to the large moment of inertia of the aircraft in the longitudinal direction and the small air loads on its control surfaces during low speed flight with effective lift augmentation means.

One expedient heretofore proposed for causing the effective lift of the main wing to be changed without changing the angle of attack of the aircraft has been the use of an adjustable lift control flap. This was employed in aircraft having the above described arrangement for blowing engine exhaust gases over the flaps. The adjustable lift control flap was mounted at the trailing edge of the externally blown trailing edge flap, and the required wing lift changes could be obtained by adjusting the lift control flap up or down to decrease or increase the effective wing camber. It was found that the lift control flap had small effect on the lift of the main wing because it was located in a position on the blown trailing edge flap where the air flow could separate easily, and in fact downward deflection of the lift control flap often produced only an increase in drag instead of the desired lift increase.

With the foregoing considerations in mind, it is the general object of this invention to provide means in an aircraft powered with turbojet engines of the by-pass type for enabling the slope of the descent or glide path of the aircraft to be quickly and easily increased or decreased without requiring change in the pitch attitude of the aircraft, for making possible a very low touchdown speed, and for utilizing engine thrust to effect rapid aerodynamic deceleration of the aircraft during the landing roll.

Another and very important object of this invention is to provide, in the main wing of a jet propelled airplane, means comprising a plurality of flaps that cooperate to provide lift augmentation during takeoff and descent and effective drag during the approach, touchdown and ground roll of a landing, and which enable the steepness of descent during the landing approach to be controlled with great facility and accuracy, which flaps are so actuated and mechanically coordinated that they require very little of the pilot's attention during an approach and landing.

Another object of this invention is to provide means for effectively reversing the thrust of a turbojet engine of the by-pass type to enable it to be used for aerodynamic braking during the landing roll.

More specifically it is an object of this invention to provide means operable during the landing roll of an aircraft powered by turbo-jet engines of the by-pass type for deflecting engine exhaust gases both upwardly and forwardly, the forward component of such deflection of the exhaust gases providing for deceleration of the aircraft during the landing roll and the upward component of such deflection being effective to increase friction forces between the wheels and the ground without danger that loose materials on the ground will be blown up and sucked into the engines.

Another specific object of this invention is to provide an aircraft powered by turbojet engines of the by-pass type having lift augmentation means comprising leading edge wing flaps and externally blown trailing edge flaps, and having additional flap means cooperable with the trailing edge flaps to provide for accurate glide slope control without the necessity for changes in pitch attitude of the aircraft and to provide for utilization of the engines to effect deceleration of the aircraft during its landing roll.

A further and very important object of this invention is to provide an integrated control system for an aircraft, whereby the pilot is required to manipulate very few controls during the course of a landing approach, touchdown and rollout and is thus relieved of many of the operations he has heretofore been required to perform during the course of a landing maneuver.

With these observations and objects in mind, the manner in which the invention achieves its purpose will be appreciated from the following description and the accompanying drawings, This disclosure is intended merely to exemplify the invention. The invention is not limited to the particular structure disclosed, and changes can be made therein which lie within the scope of the appended claims without departing from the invention.

The drawings illustrate two complete examples of physical embodiments of the invention constructed according to the best modes so far devised for the practical application of the principles thereof, and in which:

FIGURE 1 is a perspective view of an airplane embodying the principles of the invention shown in condition for landing approach;

FIGURE 2 is a sectional view through the wing of the airplane, taken substantially on the plane of the line 2—2 in FIGURE 1, showing conditions that obtain in level flight;

FIGURES 3, 4 and 5 are sectional views taken on the plane of the line 2—2 in FIGURE 1 and respectively showing the apparatus in condition for takeoff, for landing approach and for aerodynamic braking during the ground roll following touchdown;

FIGURE 6 is a more or less diagrammatic view of the actuating and control system of the apparatus of this invention; and FIGURE 7 is a fragmentary sectional view corresponding generally to FIGURE 5 but depicting a modified embodiment of the invention.

Referring now to the accompanying drawings, the numeral 5 designates generally a high-wing airplane embodying the principles of this invention and which in this case is powered by four turbojet engines 6 of the by-pass type. The engines are mounted in pairs at opposite sides of the fuselage 7 of the airplane, each pair of engines being carried by a pylon 8 that projects downwardly and forwardly from the wing 9, the pylons being spaced to opposite sides of the fuselage. The engines have their exhaust gas outlets 10 spaced a substantial distance forwardly of the trailing edge of the wing and at a distance beneath the wing that is just great enough to avoid interference, in cruising flight, between the engine exhaust streams and the bottom surface of the wing.

At each side of the fuselage 7 the wing 9 has an inboard section 11 and an outboard section 12. The inboard section lies, in general, behind the engines so that movable portions of it, described hereafter, can cooperate with the exhaust gas streams issuing from the engines. Each outboard section also has certain movable portions, described hereafter, that are separate from those on the inboard section but are actuated in coordination with them. A fixed portion 14 of the wing extends spanwise through both sections, from the fuselage to the wing tip.

The movable portions of the outboard wing sections 12 comprise leading edge flaps 15, trailing edge flaps 16, and differentially operable spoiler flap means 17. Each of these extends spanwise the full length of its outboard wing section.

Each leading edge flap 15 has an air-foil section and is pivoted to swing about an axis 18 that lies outside the flap and within the fixed portion 14 of the wing, just behind its leading edge. In its retracted or cruising flight position the leading edge flap chordwise spans and closes the bottom of a slot 19 that opens through the fixed portion of the wing, from bottom ot top thereof, at a distance behind its leading edge. In this retracted position of the leading edge flap its more highly cambered surface 20 faces downwardly and forms in effect a continuation of the bottom surface of the wing across the slot 19. In its extended, lift augmenting position, the leading edge flap is disposed a distance forwardly of the leading edge of the fixed portion of the wing and beneath it, so that the flap forms, in effect, a forward extension of the wing airfoil by which the camber as well as the area of the wing are increased.

For swinging motion between its retracted and extended positions the leading edge flap is mounted on brackets 21 whereby it is carried in spaced relation to its pivotal axis 18, said axis being a distance ahead of the flap when it is retracted and a distance behind it and slightly above it when the flap is extended. Hence when the leading edge flap is extended, it cooperates with the fixed portion of the wing to define a leading edge slot 23. Further, when the leading edge flap is extended, it opens the slot 19, which is upwardly convergent and upwardly and rearwardly curved. Both slots 19 and 23 are of course effective to cause air to be accelerated and blown rearwardly across the upper surface of the wing, thereby augmenting lift by enabling the wing to operate at high effective camber and angle of attack without flow separation, as is well known in the art.

The leading edge flaps 15 have no intermediate positions, that is, they are either in their retracted positions, as for cruising flight, or are fully extended, as for takeoff, landing approach and ground roll. Suitable actuators 24, illustrated as double acting hydraulic cylinders, are housed within the fixed portion 14 of the wing and are connected between it and the leading edge flaps for swinging the latter between their retracted and extended positions.

The trailing edge flaps 16 on the outboard sections of the wing are mounted to swing about an axis 26 that is spaced beneath their leading edges so that they swing from their retracted to their deflected positions with a bodily rearward and downward motion. To this end the fixed portion 14 of the wing can have downwardly projecting brackets 27 at its underside to which similar brackets 28 on the outboard trailing edge flaps are pivotally connected. Fixed to each flap 16 is a slat 29 that is spaced slightly from the leading edge of the flap to define a slot 30, and which provides for boundary layer control when the flap is deflected.

The outboard trailing edge flaps 16 are actuated by double acting hydraulic cylinders 31 or the like by which they can be disposed in a retracted cruising flight position in which they are streamlined with the remainder of the wing, a defined takeoff position in which they are partially deflected to effect augmentation of lift without substantially more than a proportionate increase in drag, and a defined approach and landing position in which they are fully deflected and effect substantial augmentation of lift and even greater increase in drag. The cruising flight and landing approach positions are shown in broken lines in FIGURE 6 and respectively designated by A and B, and the fully deflected position is illustrated in full lines.

The spoiler flap 17 in each outboard wing section lies chordwise just ahead of the trailing edge flap 16 and is pivoted to swing about an axis 33 near its leading edge. When retracted, the spoiler flap 17 defines a part of the upper surface of the wing. It is actuated for limited adjusting extension and for retraction by means of a double acting hydraulic cylinder 34 or the like that is under the control of the pilot's process yoke or control wheel 35. The spoiler flaps 17 operate differentially, in the manner of ailerons, and serve essentially the same purposes; that is, the aircraft is controlled in roll by raising the spoiler flap 17 of the wing to be lowered, to thereby decrease the lift of that wing. The spoiler flaps 17 are of course capable of being adjustingly controlled by means of the yoke 35 under all operating conditions.

Each of the inboard wing sections 11 has an inboard trailing edge flap 37, an upper medial flap 38 and a lower medial flap 39.

The inboard trailing edge flaps 37 are generally similar to the outboard trailing edge flaps 16. In particular, each inboard trailing edge flap is mounted to swing downwardly and rearwardly about an axis 37' that is spaced below its leading edge, being carried on a bracket 47 at its underside that is pivoted to fixed structure 48 beneath the bottom surface of the wing. Each inboard trailing edge flap has a slat 40 fixed to it above and in front of its leading edge portion to define a slot 41 that provides for boundary layer control when the flap is deflected. The inboard trailing edge flaps are actuated by hydraulic cylinders 42 or the like for swinging motion between a retracted, cruising flight position (illustrated in FIGURE 2), through a defined intermediate takeoff position (shown in FIGURE 3), to a fully extended landing approach position (shown in FIGURE 4), all corresponding to positions of the outboard trailing edge flaps 16. In addition, however, the inboard trailing edge flaps 37 can be swung beyond their fully extended position to a forwardly canted ground roll decelerating position (shown in FIGURE 5) in which their bottom surfaces are disposed at an acuate included angle to the bottom surface of the fixed portion 14 of the wing.

The leading edge of each inboard trailing edge flap is chorwise spaced from the fixed portion 14 of the wing, and the gap 36 thus defined is normally bridged by the upper and lower medial flaps 38 and 39, which respectively provide continuations of the top and bottom surfaces of the wing when in their fully retracted positions.

Each upper medial flap 38 generally resembles the spoiler flaps 17 in that it pivots about an axis 43 that is very near its leading edge and is actuated by a double acting hydraulic cylinder 44 or the like that is connected between it and the fixed portion of the wing. However, the upper medial flaps 38 are intended to be kept retracted at all times during normal cruising flight and during takeoff. During a landing approach, however, they are normally partially extended but the amount of their deflection can be adjustingly controlled from a switch 45 or the like that is mounted readily accessibly to the pilot, preferably on the yoke or control wheel 35. In such adjusting motion the upper medial flaps 38 are moved in unison for the purpose of controlling steepness of the glide slope, as explained hereafter.

After touchdown the upper medial flaps 38 can be swung to a forwardly canted roll decelerating position in which their normally upper surfaces are at an acute included angle to the top surface of the remained of the wing. Their motion to that position occurs simultaneously with motion of the inboard trailing edge flaps 37 to their roll decelerating positions.

Note that in the cruising flight condition (FIGURE 2) the trailing edge portion of each upper medial flap 38 overlies the slat 40 and the leading edge portion of its rearwardly adjacent trailing edge flap 37.

Each of the lower medial flaps 39 has a negatively cambered airfoil profile, that is, its bottom surface has greater camber than its top surface. It is mounted to swing about an axis 46 that lies within it and about midway between its leading and trailing edges. It is actuated in coordination with the inboard trailing edge flaps 37, for which purpose it may be connected, by means of a bell crank 50, with the bracket 48 upon which its rearwardly adjacent trailing edge flap 37 is pivoted.

In its retracted position for normal cruising flight (FIGURE 2) each lower medial flap 39 chordwise spans the gap 36 between the fixed portion 14 of the wing and its rearwardly adjacent trailing edge flap 37, so that its cambered bottom surface forms a continuation of the bottom surface of the remainder of the wing. As the inboard trailing edge flap 37 is deflected, the leading edge of the lower medial flap 39 swings downward.

When the trailing edge flap 37 is in its partially deflected takeoff position (FIGURE 3) the lower medial flap 39 is obliquely inclined to the bottom surface of the wing and its leading edge portion projects into the engine exhaust stream to some extent so that it deflects air and exhaust gases upwardly from beneath the wing through the gap 36 between the fixed portion 14 of the wing and the trailing edge flap 37. The flow path for such deflected air and exhaust gas is substantially convergent so that it is greatly accelerated and directed rearwardly across the top surface of the trailing edge flap as it escapes through the slot 41 between the slat 40 and the trailing edge flap 37 and through another slot 51 conjointly defined by the slat 40 and the trailing edge portion of the upper medial flap 38. The stream thus blown across the top surface of the trailing edge flap is of course very effective in preventing boundary layer separation and thus greatly augments wing lift.

In the landing approach position of the trailing edge flaps 37 (FIGURE 4) the lower medial flap 39 is disposed at a somewhat greater oblique angle to the bottom surface of the remainder of the wing than in the takeoff condition just described, and the lower medial flap again functions in cooperation with the upper medial flap 38 and the slat 40 to blow a substantially accelerated airstream over the top surface of the trailing edge flap. In the landing approach condition however, the upper medial flap 38 is normally deflected or extended upwardly to some extent, to a predetermined basic position, as indicated in full lines in FIGURE 4. With the upper medial flap in that position, pressure over that portion of the inboard wing section which is forward of the upper medial flap is higher than with the medial flap in takeoff position (compare FIGURE 3), the upwash forwardly of that section of the wing is less, and the stream blown across the top of the trailing edge flap 37 through the slot 51 is not so greatly accelerated. Under these circumstances the inboard wing sections have a substantially lower lift to drag ratio than with the medial flap in the takeoff position, so that the glide path can be relatively steep.

However, if the pilot finds that he is dropping below the established glide path or is undershooting his desired point of touchdown, he can adjustingly swing the upper medial flaps from their base positions toward their retracted positions. When this is done, pressure over the top of the wing immediately decreases and the angle of upwash increases so that the wing is effectively brought to a higher angle of attack and higher lift coefficient without the need for any change of the pitch attitude of the aircraft. Such retraction or partial retraction of the upper medial flaps 38 also results in an increased velocity of the stream blown across the tops of the trailing edge flaps 37 as the slot 51 is effectively narrowed, further contributing to wing lift and to decrease of the steepness of the glide slope. If the pilot determines that his glide slope is too shallow with the upper medial flap 38 in its base position, he can extend it to some extent to effect a further reduction in lift and increase in drag of the inboard wing sections. The amount of such further deflection beyond the base position that is available to the pilot is of course preferably limited so that the overall lift to drag ratio of the aircraft cannot be decreased to a value that would be prejudicial to its safe control. Thus the pilot has very quick, sensitive and accurate control of the glide slope solely by use of the switch 45.

When the upper medial flaps 38 and the trailing edge flaps 37 are in their forwardly canted roll decelerating positions (FIGURE 5), each lower medial flap 39 assumes an attitude in which its chord line is nearly at right angles to the bottom surface of the remainder of the wing and in which its leading edge portion projects far enough into the engine exhaust stream to effect a substantial upward and forward deflection of exhaust gases through the gap 36 between the trailing edge flap and the fixed portion of the wing. The forwardly canted trailing edge flap of course projects even farther into the exhaust stream and cooperates with the lower medial flap in producing this upward and forward deflection; and the forward inclination of the upper medial flap 38 further insures that the air and gases thus deflected will have a substantial forward component by which the aircraft is effectively decelerated.

It will be evident that the upward and forward deflection of the air and exhaust gas in the landing roll condition just described is effective to destroy wing lift and thus prevent bouncing, and that the upward component of this deflection imposes a downward reaction thrust upon the aircraft that insures good frictional rolling engagement between the wheels and the runway by which deceleration is encouraged. Furthermore, because air and gas are deflected upwardly before being deflected forwardly, there is no chance of loose material on the ground being blown up into the engine intakes.

Because the several flaps on the aircraft of this invention are intended to assume defined positions in each of the operating regimes of the aircraft, they can be governed by a very simple control system, schematically illustrated in FIGURE 6, that demands a minimum amount of the pilot's attention. This can comprise a single control lever 53 that is mounted where it will be readily accessible to the pilot, in addition to the above described control 45 for glide slope adjustment and the conventional control wheel or yoke 35, which inter alia provides for control of the spoiler flaps 17. The control lever 53 has four defined positions, designated A, B, C and D, each corresponding to one of the principal operating regimes. Suitable connections, which can be hydraulic, electrical, mechanical, or a combination of these, connect the lever 53 with the actuating means for the several flaps and preferably also with an actuating servo 54 for the retractable landing gear 55, only one main wheel unit of which is illustrated. Since the nature of these connections will be readily apparent to those skilled in the art, they are indicated only schematically in FIGURE 6, by lines connecting the control lever 53 with the several actuators.

When the control lever 53 is moved to its position designated A, the several actuators are caused to bring the units which they control to their conditions for normal cruising flight; that is, the landing gear is retracted and all flaps are fully retracted, as designated by A in each instance in FIGURE 6.

Position B of the control lever 53 establishes conditions for takeoff; that is, when the lever 53 is placed in position B the landing gear is maintained extended, the leading edge flaps 15 are moved to and maintained in their fully extended positions, and the inboard and outboard trailing edge flaps 37 and 16 are moved to and maintained in their partially extended takeoff positions as designated in each instance by B in FIGURE 6. The upper medial flaps 38 remain retracted so that they cannot interfere with generation of lift by the wing.

Position C of the control lever 53 establishes landing approach conditions; that is, when the lever is moved to position C the leading edge flaps are actuated to and maintained in their extended positions, the trailing edge flaps 16 and 37 are moved to and maintained in their fully deflected positions and the landing gear is extended, as denoted in each instance by C in FIGURE 6. With the lever 53 in the C position—and only with that lever in that position—the upper medial flaps 38 are normally maintained in a predetermined partially deflected base condition, from which they can be adjustingly retracted and further deflected under the control of the switch 45 to provide for fine control of steepness of the glide path without requiring changes in the pitch attitude of the aircraft.

The lever 53 is placed in its position D at or immediately after touchdown to establish aerodynamic braking conditions. In that position of the lever 53 the landing gear and leading edge flaps remain extended and the outboard trailing edge flaps 16 remain fully extended, while the inboard trailing edge flaps 37 and the upper medial flaps 38 swing to their forwardly canted positions in which they cooperate with the lower intermediate flaps 39 in deflecting air and engine exhaust gas upwardly and forwardly. In FIGURE 6 the conditions of the several units with the lever 53 in its landing roll position are designated, in each instance, by D.

As illustrated in FIGURE 7, the fixed portion 14 of the wing, in its inboard sections, can be provided with a fairing 57 that projects rearwardly into the gap 36 and is curved to merge rather smoothly into the bottom surface of the wing and to provide more or less of a continuation of the rear surface of the upper medial flap 38 when the same is in its forwardly canted position. The fairing 57 promotes forward deflection of the stream moving through the gap 36 under landing roll conditions.

Further to increase the forward component of such deflection, the lower medial flap 39 can be provided with a pair of slots 58 and 59, as illustrated in FIGURE 7, to prevent air flow separation from the lower (more cambered) surface of that flap. To the same end, the slat 40 on each trailing edge flap 37 can be made angularly adjustable relative to that flap, so that when the flap 37 is canted forwards the slat can be rotated forward, to the position shown in solid lines in FIGURE 7, to where it efficiently contributes to the deflection.

From the foregoing description taken with the accompanying drawings it will be readily apparent that this invention provides an STOL aircraft powered by turbojet engines of the by-pass type which is capable of a very low minimum flying speed but which is nevertheless accurately controllable with respect to steepness of its glide path during a landing approach, and is provided, moreover, with a very simple control system that makes it possible for the pilot to execute an approach and landing with a minimum of work and concentration. It will be further apparent that the invention makes it possible for turbojet engines of the by-pass type, without thrust reversers, to be used for aerodynamic braking during the landing roll.

What is claimed as my invention is:

1. In an aircraft having a main wing with fixed and movable portions and having a jet engine mounted with its exhaust outlet beneath a fixed portion of the wing and near the leading edge of the wing:
   flap means laterally in line with the engine and spaced behind the leading edge of the wing, said flap means being movable to a position in which
   (1) a portion of the flap means has a rearwardly and upwardly inclined surface that projects beneath the bottom surface of the wing into the stream of engine exhaust gas to deflect such gas upwardly, and (2) another portion of the flap means is disposed at a level above the bottom surface of the wing and is arranged to impart a forward direction to the upwardly deflected exhaust gas stream, for deceleration of landing roll.

2. The aircraft of claim 1 further characterized by:
(A) the first designated portion of the flap means comprising a trailing edge flap that is chordwise spaced behind the fixed portion of the wing and is also movable to lift augmenting positions in which it is rearwardly and downwardly inclined relative to the bottom surface of the fixed portion of the wing and to a retracted position in which it is substantially streamlined with the fixed portion of the wing; and
(B) said other portion of the flap means comprising:
  (1) an upper intermediate flap that is movable between a retracted position in which it chordwise bridges the space between the fixed portion of the wing and the trailing edge flap and is effectively continuous with their top surfaces, and a roll braking position in which it is forwardly and upwardly inclined, and
  (2) a lower intermediate flap which has an airfoil section with inverted camber and is movable between a retracted position bridging said space and a roll braking position with its leading edge lowermost and its more highly cambered surface rearmost.

3. The aircraft of claim 2 further characterized by:
(A) said lower intermediate flap being pivoted about a spanwise extending axis that lies within it, intermediate its leading and trailing edges, and substantially at the level of the bottom surface of the fixed portion of the wing; and
(B) link means connecting said lower intermediate flap with the trailing edge flap to operate in unison therewith so that the lower intermediate flap is upwardly and rearwardly inclined to deflect air and exhaust gas upwardly and rearwardly through said space, beneath the upper intermediate flap and thus across the top surface of the trailing edge flap, when the latter is in its lift augmenting positions.

4. The aircraft of claim 3 further characterized by: a leading edge slat on the trailing edge flap.

5. The aircraft of claim 2, further characterized by: means for controllably actuating the upper intermediate flap between its retracted position and a predetermined partially deflected position, to thereby enable the steepness of the glide slope of the aircraft to be adjusted without change in the attitude of the aircraft.

6. The aircraft of claim 1 wherein the flap means is servo actuated, further characterized by:
(A) the aircraft having a landing gear that is servo actuated for extension and retraction; and
(B) means providing unified control of the servos for the flap means and the landing gear whereby the landing gear is extended whenever the flap means is out of its retracted position and the landing gear is retracted whenever the flap means is fully retracted.

References Cited

UNITED STATES PATENTS

| | | | |
|---|---|---|---|
| 3,089,672 | 5/1963 | Huchala | 244—42 X |
| 3,154,267 | 10/1964 | Grant | 244—42 X |

MILTON BUCHLER, Primary Examiner

J. L. FORMAN, Assistant Examiner

U.S. Cl. X.R.

244—12. 102